(12) United States Patent
Best

(10) Patent No.: US 11,461,740 B2
(45) Date of Patent: Oct. 4, 2022

(54) PRINTER ACTING AS HOST FOR DEVICE PRINTERS/SCANNERS

(71) Applicant: AVERY DENNISON RETAIL INFORMATION SERVICES, LLC, Mentor, OH (US)

(72) Inventor: David Eric Best, Miamisburg, OH (US)

(73) Assignee: Avery Dennison Retail Information Services LLC, Mentor, OH (US)

( * ) Notice: Subject to any disclaimer, the term of this patent is extended or adjusted under 35 U.S.C. 154(b) by 355 days.

(21) Appl. No.: 16/525,045

(22) Filed: Jul. 29, 2019

(65) Prior Publication Data

US 2019/0354938 A1 Nov. 21, 2019

Related U.S. Application Data

(62) Division of application No. 15/393,872, filed on Dec. 29, 2016, now Pat. No. 10,373,125.

(51) Int. Cl.
*G06Q 10/00* (2012.01)
*H04N 1/327* (2006.01)
(Continued)

(52) U.S. Cl.
CPC ......... *G06Q 10/20* (2013.01); *G06K 17/0025* (2013.01); *H04L 63/083* (2013.01);
(Continued)

(58) Field of Classification Search
CPC ...... G06F 16/9554; G06F 8/35; G06F 9/4843; G06F 16/5838; G06F 9/3004; G06F 9/542; G06F 16/20; G06F 16/21; G06F 8/61; G06K 17/0025; G06Q 10/20; H04L 63/083; H04N 1/00334; H04N 1/32765; (Continued)

(56) References Cited

U.S. PATENT DOCUMENTS

| | | | |
|---|---|---|---|
| 5,426,511 A | 6/1995 | Nagatomo | |
| 6,047,111 A | 4/2000 | Sugiura et al. | |

(Continued)

FOREIGN PATENT DOCUMENTS

| | | |
|---|---|---|
| CN | 1690625 | 11/2005 |
| CN | 1716285 | 1/2006 |

(Continued)

OTHER PUBLICATIONS

International Search Report and Written Opinion dated Sep. 26, 2017 prepared for PCT/US2016/069174.
(Continued)

*Primary Examiner* — Negussie Worku

(57) ABSTRACT

A method of pairing a handheld printer/scanner device with a barcode printer acting as the host is disclosed. The pairing will further enhance the functionality of the host barcode printer. Specifically, the pairing process is initiated when a printer process that requires a handheld printer/scanner device is initiated. The method enables a handheld printer/scanner device to print to a host barcode printer, and also enables the host barcode printer to receive a barcode scan of the case label of received food items and retain information from the barcode scan for future printing of food freshness labels.

19 Claims, 8 Drawing Sheets

(51) Int. Cl.
*H04L 9/40* (2022.01)
*H04W 12/50* (2021.01)
*H04N 1/00* (2006.01)
*H04W 12/06* (2021.01)
*G06K 17/00* (2006.01)
*H04W 12/77* (2021.01)

(52) U.S. Cl.
CPC ..... *H04N 1/00334* (2013.01); *H04N 1/32765* (2013.01); *H04W 12/06* (2013.01); *H04W 12/50* (2021.01); *H04N 2201/0041* (2013.01); *H04N 2201/0046* (2013.01); *H04N 2201/0055* (2013.01); *H04N 2201/0081* (2013.01); *H04N 2201/0082* (2013.01); *H04N 2201/0096* (2013.01); *H04N 2201/3207* (2013.01); *H04W 12/77* (2021.01)

(58) Field of Classification Search
CPC ... H04N 2201/0041; H04N 2201/0046; H04N 2201/0055; H04N 2201/0081; H04N 2201/0082; H04N 2201/0096; H04N 2201/3207; H04W 12/06; H04W 12/50; H04W 12/77
USPC .......................................................... 235/385
See application file for complete search history.

(56) References Cited

U.S. PATENT DOCUMENTS

| | | | |
|---|---|---|---|
| 6,290,131 | B1 | 9/2001 | Kolis et al. |
| 6,379,058 | B1* | 4/2002 | Petteruti ............... B41J 3/36 |
| | | | 400/61 |
| 9,280,704 | B2* | 3/2016 | Lei ....................... H04L 9/0844 |
| 10,009,569 | B2 | 6/2018 | Ko |
| 10,691,785 | B1* | 6/2020 | Budnitz ............... H04L 9/3271 |
| 10,744,793 | B2 | 8/2020 | Pursel et al. |
| 2003/0090701 | A1 | 5/2003 | Crane et al. |
| 2003/0156567 | A1 | 8/2003 | Oak |
| 2004/0024933 | A1 | 2/2004 | Billington et al. |
| 2004/0027283 | A1 | 2/2004 | Dooley et al. |
| 2004/0141487 | A1 | 7/2004 | Lee |
| 2005/0012956 | A1 | 1/2005 | Castle |
| 2005/0044479 | A1 | 2/2005 | Williams et al. |
| 2005/0237568 | A1 | 10/2005 | Yun |
| 2005/0284944 | A1* | 12/2005 | Ming ............... G06K 19/06037 |
| | | | 235/494 |
| 2006/0080423 | A1 | 4/2006 | Brewer et al. |
| 2006/0140698 | A1 | 6/2006 | Nishi |
| 2006/0169775 | A1 | 8/2006 | Gray et al. |
| 2006/0221363 | A1 | 10/2006 | Roth et al. |
| 2006/0272010 | A1 | 11/2006 | Kim |
| 2007/0123166 | A1 | 5/2007 | Sheynman et al. |
| 2007/0300004 | A1 | 12/2007 | Yun |
| 2008/0024815 | A1 | 1/2008 | Oak |
| 2010/0103238 | A1* | 4/2010 | Neuhard ............... B65C 11/021 |
| | | | 347/109 |
| 2010/0121952 | A1 | 5/2010 | Hara |
| 2011/0081860 | A1* | 4/2011 | Brown ............. G06K 19/06028 |
| | | | 455/41.3 |
| 2011/0213671 | A1 | 9/2011 | Hirson et al. |
| 2012/0280042 | A1 | 11/2012 | Grant et al. |
| 2012/0320423 | A1 | 12/2012 | Kobayashi |
| 2013/0057897 | A1 | 3/2013 | Park et al. |
| 2013/0109316 | A1 | 5/2013 | Lee |
| 2013/0148149 | A1 | 6/2013 | Park et al. |
| 2013/0215467 | A1* | 8/2013 | Fein ....................... G06F 3/1292 |
| | | | 358/1.15 |
| 2014/0092425 | A1 | 4/2014 | Park |
| 2014/0211026 | A1 | 7/2014 | Sakai |
| 2014/0351904 | A1 | 11/2014 | Marsaud et al. |
| 2014/0370807 | A1* | 12/2014 | Lei ....................... H04W 12/50 |
| | | | 455/41.2 |
| 2016/0073348 | A1 | 3/2016 | Tsuzuki |
| 2016/0303025 | A1* | 10/2016 | Kinjalbahen ........ A61Q 19/007 |
| 2019/0149577 | A1* | 5/2019 | Kelly ................. G06Q 20/3276 |
| | | | 713/168 |

FOREIGN PATENT DOCUMENTS

| | | |
|---|---|---|
| CN | 102567747 | 7/2012 |
| CN | 103248776 | 8/2013 |
| CN | 105554588 | 5/2016 |
| CN | 105684013 | 6/2016 |
| GB | 2353432 | 2/2001 |
| JP | H11110160 | 4/1999 |
| JP | 2006-244360 | 9/2006 |
| JP | 2011087172 | 4/2011 |
| JP | 2011-201091 | 10/2011 |

OTHER PUBLICATIONS

S. Barua and R. Nashef, "JINI enabled printer interface (JEPI)," IEEE International Conference on Systems, Man and Cybernetics, Yasmine Hammamet, Tunisia, 2002, pp. 176-181., URL http://ieeexplore.ieee.org/document/1173405/.

P. Bigioi, I. Raducan, E. Steinberg and P. Corcoran, "Enabling Legacy PTP Cameras and Printers as Networked PTP/IP Appliances," 2007 Digest of Technical Papers International Conference on Consumer Electronics, Las Vegas, NV, 2007, pp. 1-2. URL: http://ieeexplore.ieee.org/document/4146055/.

V. Garg, L. Cherkasova, S. Packirisami and J. Rolia, "ACE: Automated capacity evaluation for HP ePrint," 2013 IFIP/IEEE International Symposium on Integrated Network Management (IM 2013), Ghent, 2013, pp. 1068-1069., URL: http://ieeexplore.ieee.org/document/6573132/.

Y. Suzuki and M. Sumi, "Multiband film antenna comprising offset fed dipole elements using inkjet printer for M2M applications," 2016 International Workshop on Antenna Technology (IWAT), Cocoa Beach, FL, 2016, pp. 51-54., URL: http://ieeexplore.ieee.org/document/7434798/.

A Zebra Technologies White Paper, "How Mobile Printing Benefits Warehouse Operations", URL: http://www.mmh.com/wp_content/scc_wp_mobile_printing_042513.pdf.

A Zebra Technologies White Paper, "Electronic Citation Systems: Improving Officer Safety, Saving Time and Improving Accuracy", URL: https://www.zebra.com/content/dam/zebra/white-papers/en-us/e-citation-en-us.pdf.

International Preliminary Report on Patentability dated Jul. 11, 2019 issued in corresponding IA No. PCT/US2016/069174 filed Dec. 29, 2016.

ELECOM, Bluetooth Stereo Headset, Instruction Manual, Jul. 1, 2016.

Teramae, Yuji, Bluetooth Wireless I/Q, Second Edition, CQ Publishing Co., Transistor Technology Editor, Feb. 1, 2016.

* cited by examiner

PRINTER ACTING AS HOST FOR DEVICE PRINTERS/SCANNERS

CROSS REFERENCE TO RELATED APPLICATION(S)

The present application is a division of, claims priority to and the benefit of U.S. patent application Ser. No. 15/393,872 filed Dec. 29, 2016, patented as U.S. Pat. No. 10,373,125, which is incorporated by reference herein in its entirety.

BACKGROUND

The present invention relates generally to food freshness barcode printers or smart printers acting as a host to a handheld printer/scanner device. More particularly, the present disclosure relates to a process of pairing a handheld printer/scanner device with a barcode printer acting as the host that will enhance the functionality of the host printer.

A barcode printer is a computer peripheral for printing barcode labels or tags that can be attached to, or printed directly on, physical objects. Barcode printers are commonly used to label cartons before shipment, or to label retail items with UPCs or EANs. The most common barcode printers employ one of two different printing technologies. Direct thermal printers use a print head to generate heat that causes a chemical reaction in specially designed paper that turns the paper black. Thermal transfer printers also use heat, but instead of reacting the paper, the heat melts a waxy or resin substance on a ribbon that runs over the label or tag material. The heat transfers ink from the ribbon to the paper.

Barcode printers are designed for different markets. Industrial barcode printers are used in large warehouses, manufacturing facilities, and food facilities. They have large paper capacities, operate faster and have a longer service life. For retail and office environments, desktop barcode printers are most common.

Furthermore, in traditional food preparation and service areas, or other suitable areas, food freshness barcode printers are installed. In these areas, the non-technical user is required to complete tasks such as receiving, breaking down inner packs, putting away ingredients, and maintaining information required for Food Safety. Thus, as the requirements for information supporting supply chain visibility initiatives and Food Service traceability requirements increase, it is desirable to expand the role of a food freshness barcode printer in store to support these goals.

Thus, there exists a need for a food freshness barcode printer or smart printer utilized for printing freshness labels to enhance the operations of a handheld printer/scanner device, such as by enabling the host printer to receive the barcode scan of a case label and retain the information for future label printing use. The present invention discloses a method of pairing the handheld printer/scanner device with a barcode printer acting as a host that will enhance the functionality of the host printer.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The subject matter disclosed and claimed herein, in one aspect thereof, comprises a method of pairing a handheld printer/scanner device with a barcode printer acting as the host. The pairing will further enhance the functionality of the host barcode printer. Specifically, the pairing process is initiated when a printer process that requires a handheld printer/scanner device is initiated. For exemplary purposes this description will use the specific application of receiving food in a restaurant, although the method can be utilized with other applications as is known in the art.

In a preferred embodiment, the method enables a handheld printer/scanner device to print to a host barcode printer, such as food freshness labels and other similar labels. The method also enables the host barcode printer to receive a barcode scan of the case label of received food items or other items and retain information from the barcode scan for future printing of food freshness labels and other labels as is known in the art.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
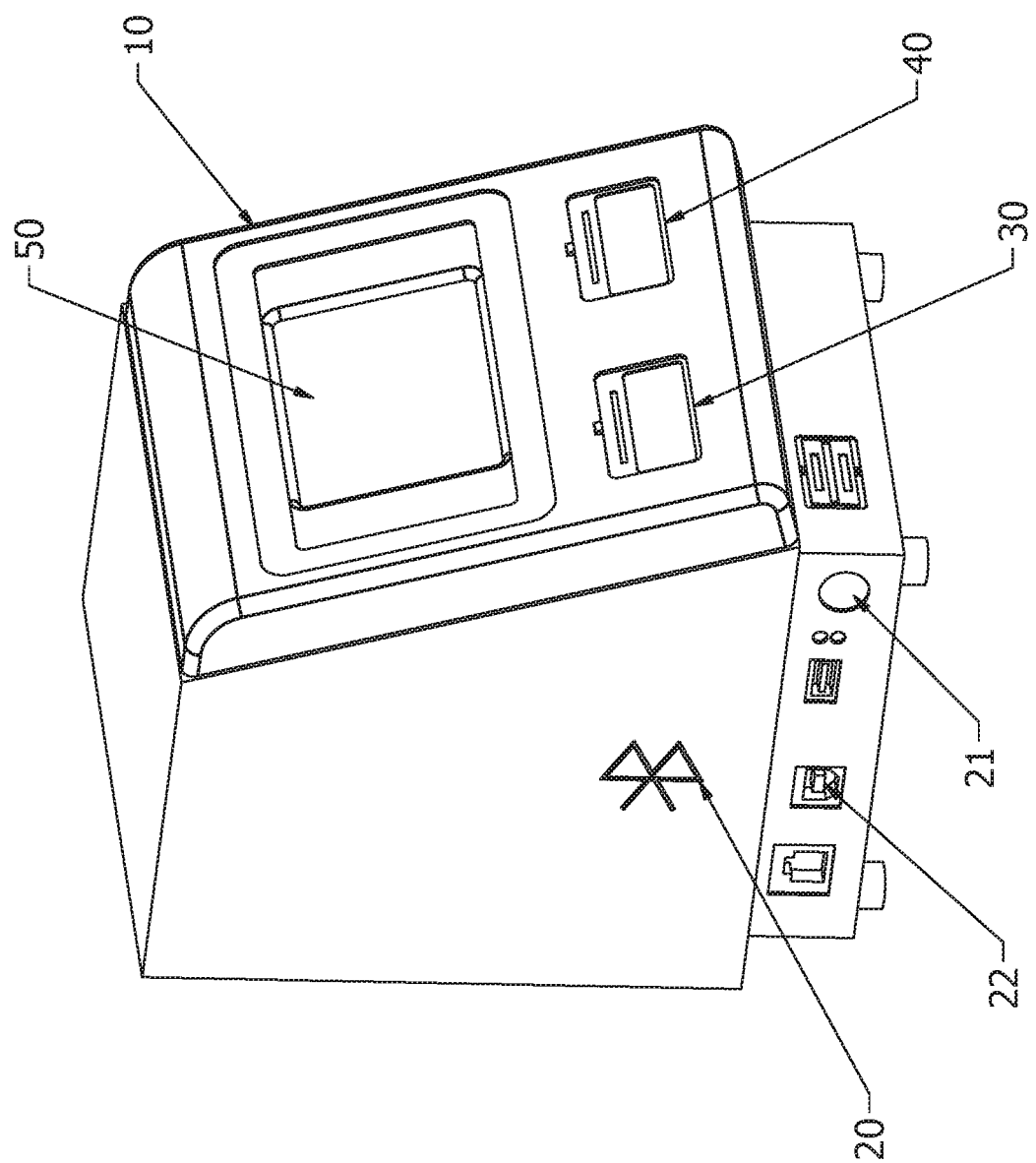
FIG. 1 illustrates a front perspective view of a barcode printer in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

A method of pairing a handheld printer/scanner device with a barcode printer acting as the host. The pairing will further enhance the functionality of the host barcode printer. Specifically, the method enables a handheld printer/scanner device to print to a host barcode printer, and also enables the host barcode printer to receive a barcode scan of the case label and retain information from the barcode scan for future printing of labels.

Referring initially to the drawings, FIG. 1 illustrates a barcode printer 10 in accordance with the present invention, however any suitable barcode printer can be used as is known in the art. The barcode printer 10 comprises a thermal print head (shown in FIGS. 4, 428 and 430) for printing barcodes and alphanumeric information on a web of record members such as tags, labels or the like. The supply of the web of record members may be of the direct printing type such that the record members include paper coated with a thermally responsive material. Alternatively, the supply used with the barcode printer 10 may be of the transfer type wherein a carbon ribbon is heat activated by the print head so as to print on the record members. The print head is strobed to control the amount of energy applied thereto for printing. More particularly, current is applied to the print head during a strobe time in order to print one line on a record member.

The barcode printer 10 also includes a stepper motor (shown in FIGS. 4, 424 and 426) or the like that is responsive to a periodic drive signal, the period of which is defined by the time between the leading edges of consecutive or adjacent pulses of the drive signal. The stepper motor is responsive to the drive signal to advance the web of record members past the print head for printing. The drive signal controls the speed of the stepper motor which in turn controls the print speed of the barcode printer 10.

A controller (shown in FIG. 4, 432) includes a microprocessor 420 or the like which operates in accordance with software routines stored in a memory so as to control the operations of the barcode printer 10. A number of sensors, monitors, detectors or the like such as depicted at 412, 414, 416 and 418 (see FIG. 4), monitor operating conditions of the barcode printer 10 including the resistance of the print head, the contrast setting of the barcode printer, the temperature of a heat sink on which the print head is mounted and the voltage of a battery powering the barcode printer 10. The measured values of the print head resistance, contrast setting, heat sink temperature, battery voltage, as well as other operating variables if desired, are utilized by the microprocessor when implementing print speed control.

Furthermore, the barcode printer 10 would typically be located in the foodservice work area, but could be situated in any suitable area as is known in the art. The barcode printer 10 is a Bluetooth compliant device 20 which further comprises at least one 802.11 a/b/e/g antenna at 21 and at least one USB device port 22, however any suitable number of antenna and USB device ports can be utilized as is known in the art, depending on the wants and needs of a user. The barcode printer 10 also comprises at least two station embedded printers 30 and 40, however any suitable number of station embedded printers can be utilized as is known in the art, depending on the wants and needs of a user. These station embedded printers 30 and 40 can run different supply sizes. Finally, the barcode printer 10 comprises a user display 50 or monitor.

Figure 2:
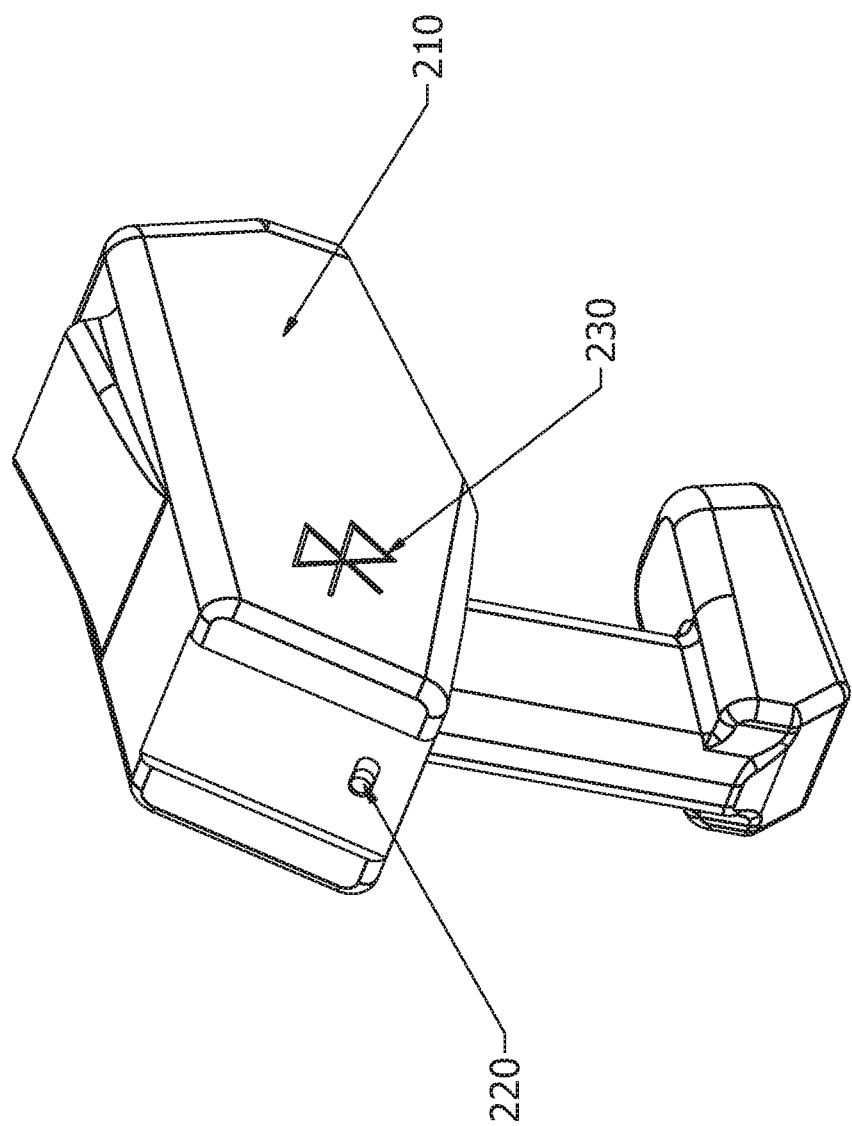
FIG. 2 illustrates a rear perspective view of a handheld printer/scanner device in accordance with the disclosed architecture.

Generally referring to FIG. 2, the disclosed food freshness barcode printer, or any other suitable barcode printer or smart printer would be paired with a handheld printer/scanner device 210. The handheld printer/scanner device 210 is Bluetooth enabled shown at 230 and comprises a power switch 220, as well as any other necessary mechanics and functionality as is known in the art.

Figure 3:
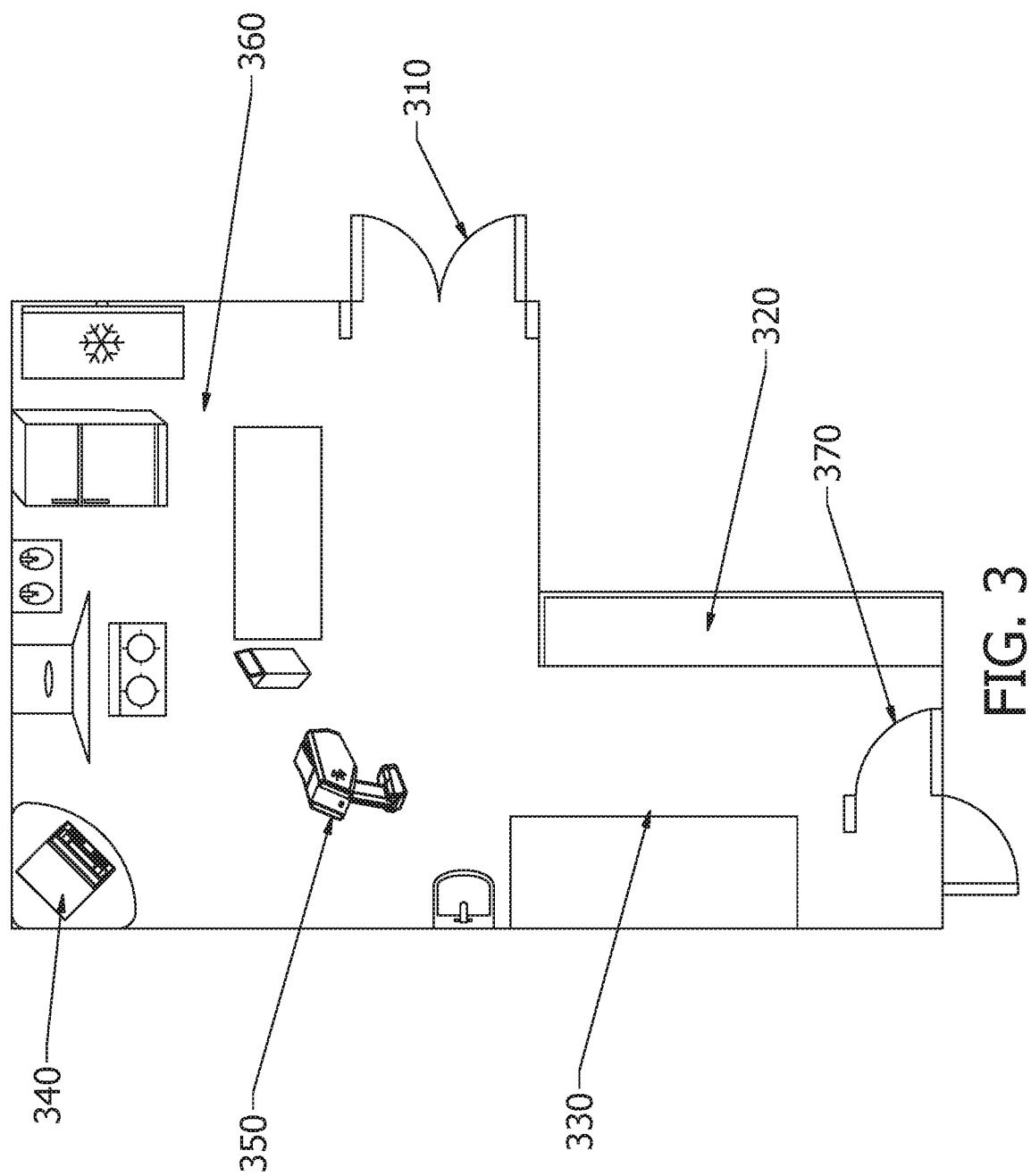
FIG. 3 illustrates a top plan view of the barcode printer and handheld printer/scanner device in proximity to each other in accordance with the disclosed architecture.

FIG. 3 illustrates a typical layout of a food preparation area for a food service facility where both printers 10 and 210 would be located. As shown in FIG. 3, the receiving door 310 is where both cold and dry storage items are processed. Within the dry storage area, are shelving units 320 for dry storage and a work station 330. At 340, another work station is shown where the food freshness host printer 10 would be located. Cold storage is shown at 360 and swinging doors 370 lead to the customer service area. Further, the handheld portable printer/scanner device 210 is shown at 350. The handheld portable printer/scanner device 210 is paired with the food freshness host printer 10, which allows the handheld portable printer/scanner device 210 to print from the food freshness host printer 10, wherever the food freshness host printer 10 is located within the food service facility.

Figure 4:
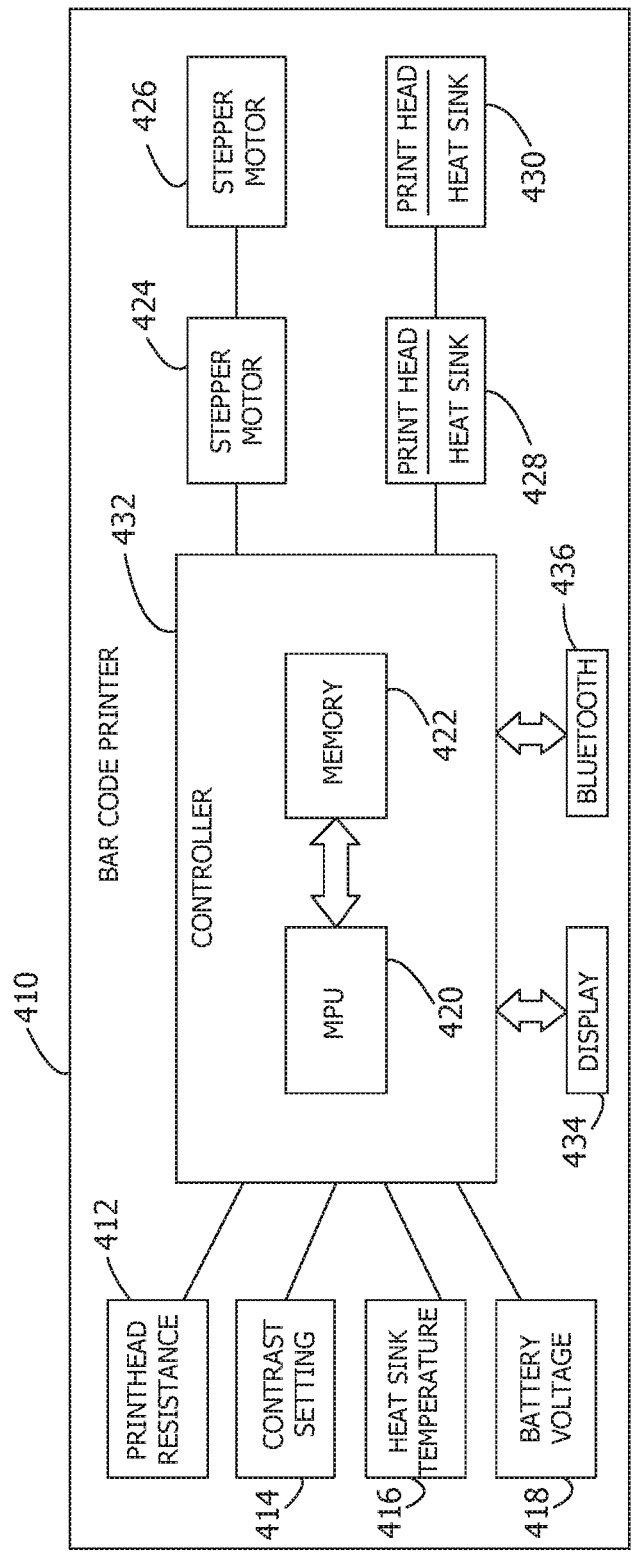
FIG. 4 illustrates a flowchart of the barcode printer in accordance with the disclosed architecture.

FIG. 4 illustrates the barcode printer 410 (also shown in FIG. 1 as 10) which comprises a thermal print head 412 for printing barcodes and alphanumeric information. The print head resistance 412 is strobed or heated to control the amount of energy applied thereto for printing. This energy will be varied based upon the heat of the print as determined by the heat sink depicted at 416. The contrast setting, 414, will also impact the length of the strobe. The barcode printer 410 also includes two stepper motors 424 and 426. The stepper motor 424 controlled by MPU 420 advances the web of record members past the print head 428 for printing. In addition, stepper motor 426 controlled by MPU 420 advances the web of record members past the print head 430 for printing.

The barcode printer 410 also includes a controller 432 which includes a microprocessor 420 or the like which operates in accordance with software routines stored in a memory 422 so as to control the operations of the barcode printer 410. The software of the present invention is typically customizable per a user's request which allows the software to be easily tailored around a user's requirement.

A number of sensors, monitors, detectors or the like such as depicted at 412, 414, 416, and 418, monitor operating conditions of the barcode printer 410 including the resistance of the print heads 428 and 430, the contrast setting of the barcode printer, the temperature of the heat sink at 428 and 430 and the voltage of a battery powering the barcode printer 410. The measured values of the print head resistance, contrast setting, heat sink temperature, battery voltage, as well as other operating variables if desired, are utilized by the microprocessor 420 when implementing print speed control.

Furthermore, the barcode printer 410 is a Bluetooth compliant device 436 which further comprises at least one 802.11 a/b/e/g antenna and at least one USB device port. The barcode printer 410 also comprises a user display 434 or monitor.

Figure 5:
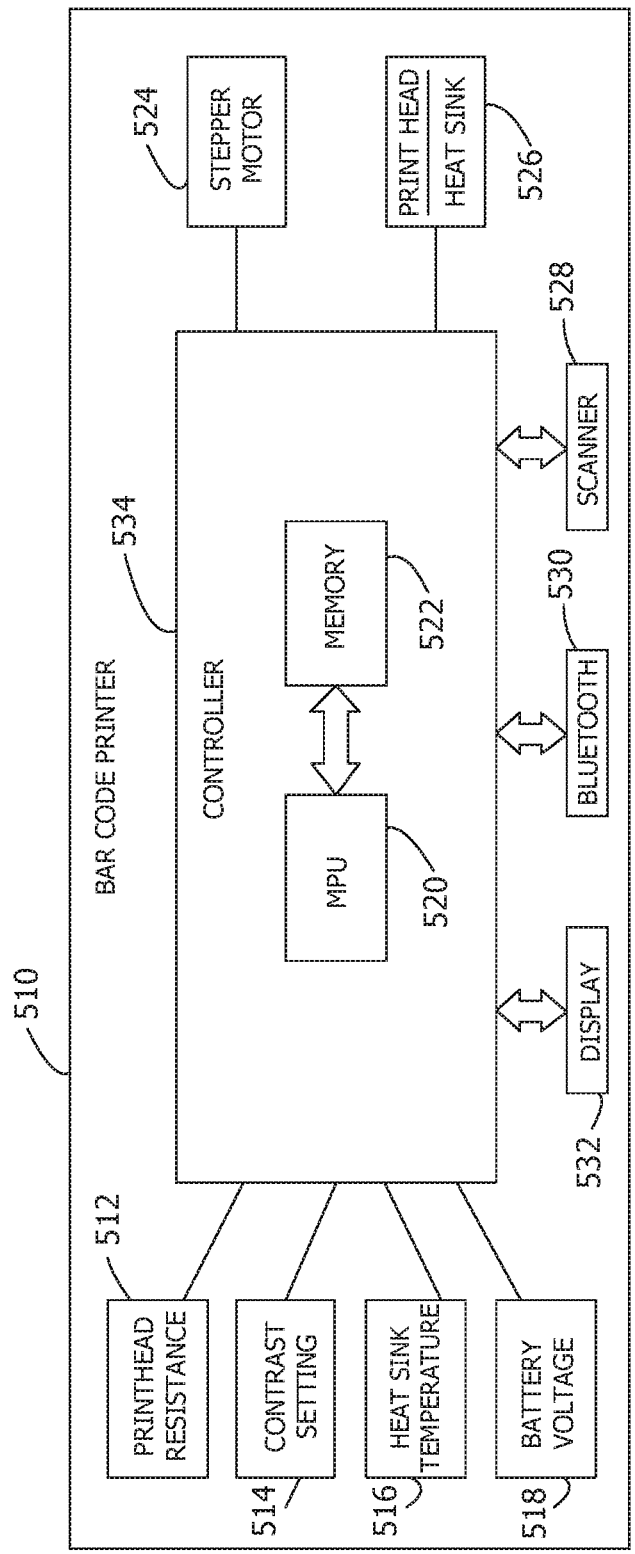
FIG. 5 illustrates a flowchart of the handheld printer/scanner device in accordance with the disclosed architecture.

FIG. 5 illustrates the control board of barcode printer 510 (also shown in FIG. 2 as 210). This control board has minor variances to the control board for printer 410, for example printer 510 contains one printer station instead of two. The printer 510 also comprises a thermal printer head 526 for printing barcodes and alphanumeric information. The printer head 526 is strobed or heated to control the amount of energy applied thereto for printing. This energy will be varied based upon the heat of the print as determined by the heat sink depicted in 526. The contrast setting, 514, will also impact the length of the strobe.

The barcode printer 510 also includes a stepper motor 524. The stepper motor 524 controlled by MPU 520 advances the web of record members past the print head 526 for printing. A controller 534 includes a microprocessor 520 or the like which operates in accordance with software routines stored in a memory 522 so as to control the operations of the barcode printer 510. The software of the present invention is typically customizable per a customer's request which allows the software to be easily tailored around a customer's requirements.

A number of sensors, monitors, detectors or the like such as depicted at 512, 514, 516, and 518, monitor operating conditions of the barcode printer 510 including the resistance of the print head 526, the contrast setting of the barcode printer, the temperature of the heat sink in 526 and the voltage of a battery powering the barcode printer 510. The measured values of the printer head resistance, contrast setting, heat sink temperature, battery voltage, as well as other operating variables if desired, are utilized by the microprocessor 520 when implementing print speed control.

Furthermore, the barcode printer 510 is a Bluetooth compliant device 530 which further comprises at least one 802.11 a/b/e/g antenna and at least one USB device port. The barcode printer 510 also comprises a user display 532 or monitor, and a scanner 528.

Figure 6:
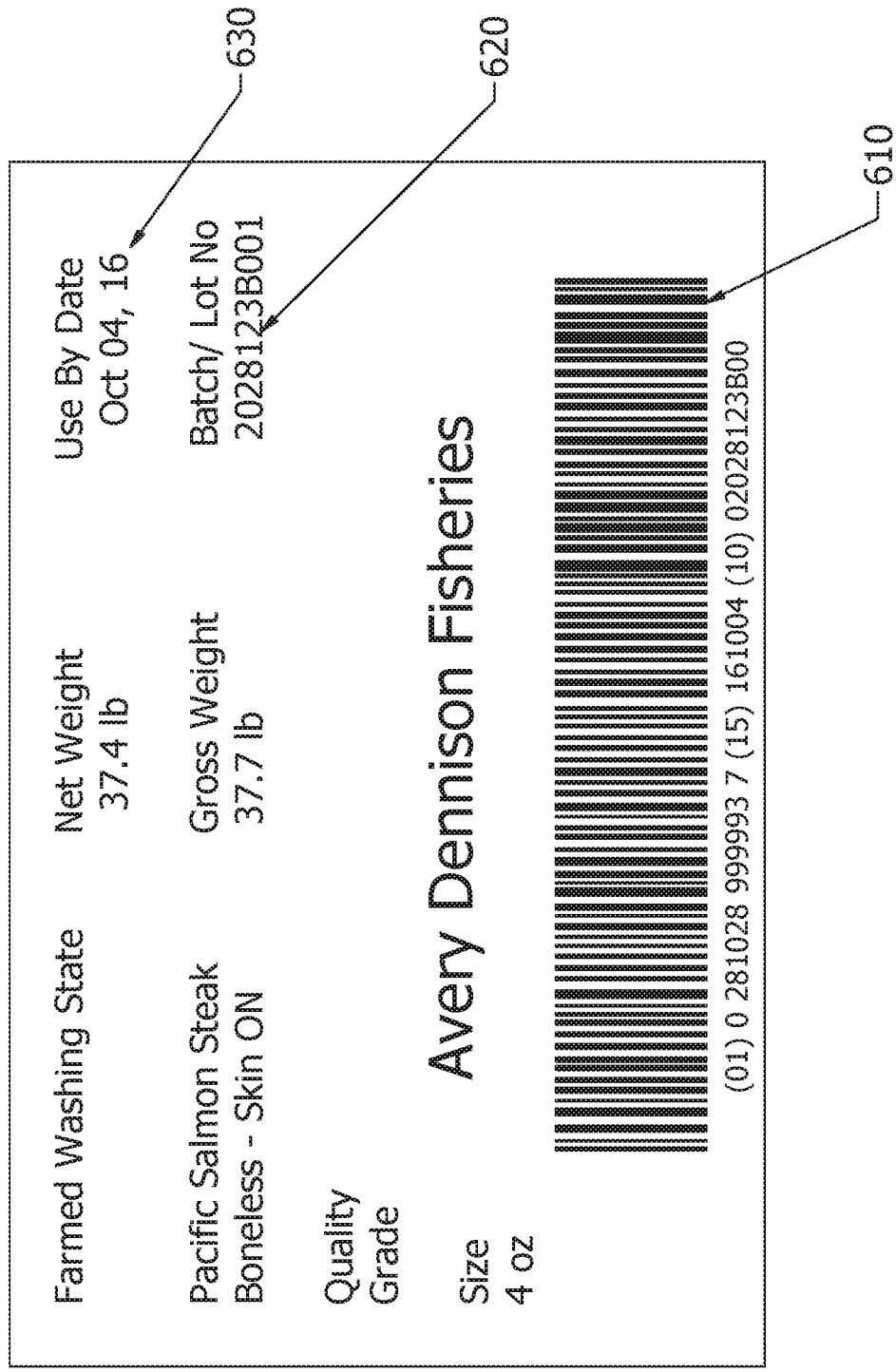
FIG. 6 illustrates a front plan view of a case label in accordance with the disclosed architecture.

An example case label for use with the printers 10 (also 410) and 210 (also 510) is shown in FIG. 6. Handheld printer/scanner device 210 scans the barcode shown at 610 on the label. This barcode is encoded with a unique identification identifying the manufacturer, the item number, the lot number, and the best by date. The lot number is also indicated in the human readable number shown at 620 and the best by date is indicated in the human readable number shown at 630. Handheld printer/scanner device 210 sends this information back to the barcode host printer 10 which is running a specific application. The application extracts the lot number and best by date from barcode 610. This lot number and best by date can then be printed on food freshness labels when food items are removed from either cold storage or dry storage.

Figure 7:
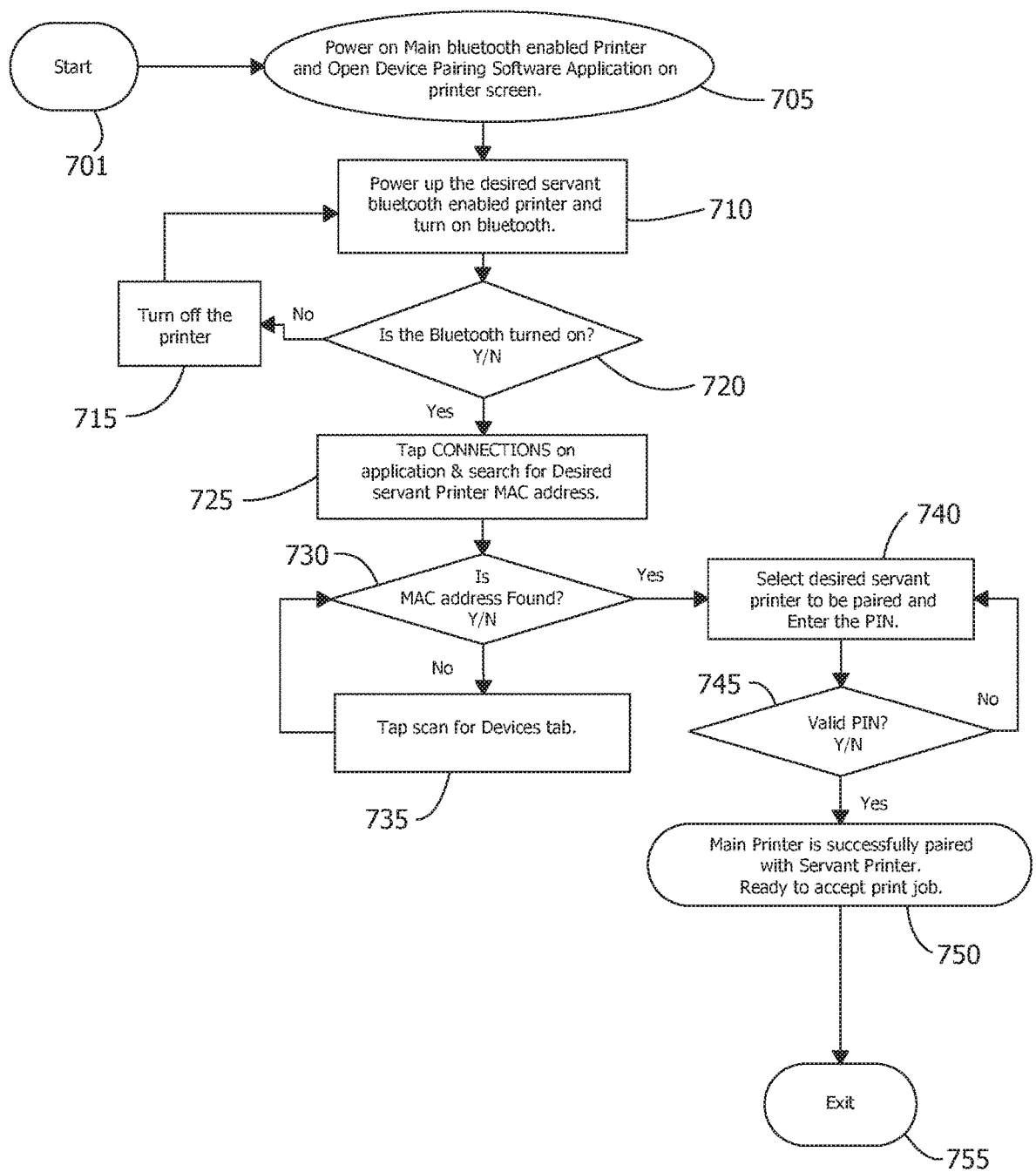
FIG. 7 illustrates a flowchart of the process for pairing the barcode printer and the handheld printer/scanner in accordance with the disclosed architecture.

However, before the Bluetooth printer can print from the food freshness printer the device must be paired with the printer. FIG. 7 outlines the process required for pairing the devices. At 701, the process is entered. At 705, the printer 10 is powered on and the application selection screen is presented on display 50, the application that utilizes device pairing must then be selected and started. In this case, this application is the receiving process for food service application. At 710, the handheld printer/scanner device 210 is powered on. The user then verifies that the Bluetooth is turned on at 720. If the Bluetooth is not enabled, the Bluetooth is enabled and the handheld printer/scanner device 210 is powered down at 715 and the process returns to 710.

If Bluetooth is enabled, then at 725 a user taps the command CONNECTIONS on printer 10 and searches for the desired handheld printer/scanner device 210. At 730, it is determined if the printer MAC address is found. If no, then at 735 the user taps the "Scan for Devices" tab and the process returns to 730. If yes, then at 740 the desired handheld printer/scanner device 210 (servant printer) is selected to be paired and the PIN code is entered. If the PIN code is valid, then at 745 the desired handheld printer/scanner device 210 is successfully paired and ready to print and the process is exited at 755. If the PIN code is not valid, then at 745 the process returns to 740 for the user to re-enter a correct PIN code.

Figure 8:
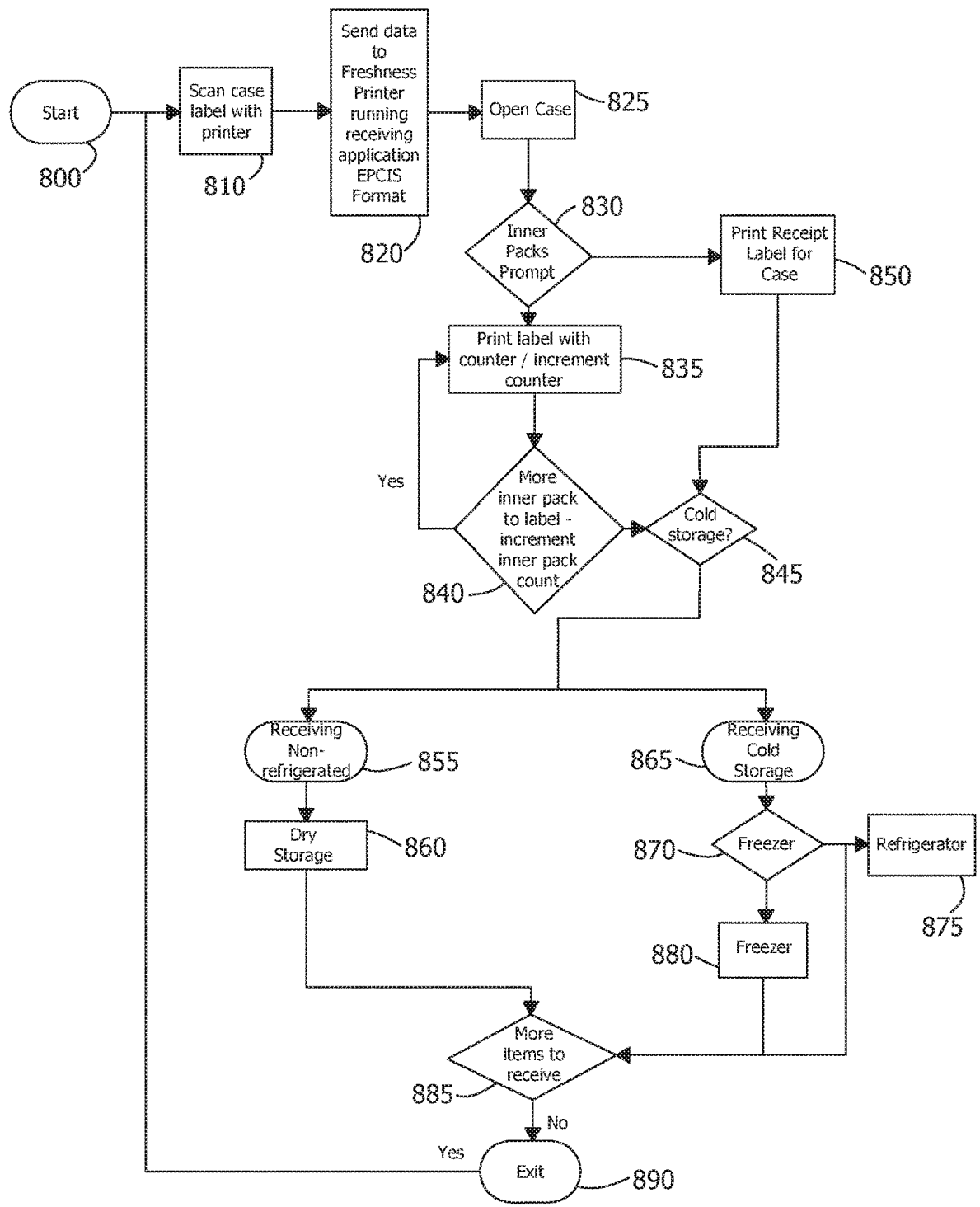
FIG. 8 illustrates a flowchart of the receiving process in accordance with the disclosed architecture.

Once the pairing is complete between barcode host printer 10 and handheld printer/scanner device 210, the receiving application shown in the flow chart in FIG. 8 is enabled to complete the receiving operations. When cases are received through the receiving door, the barcode scanner on the handheld printer/scanner device 210 is used to scan the case label as indicated in FIG. 8. As stated supra, an example case label is shown in FIG. 6. Handheld printer/scanner device 210 sends this information back to barcode host printer 10 which is running a specific application. The application extracts the lot code and best by date from barcode 610. This lot code and best by date can be printed on food freshness labels when food items are removed from either cold storage or dry storage.

As shown in FIG. 8, the receiving process can be completed after the printer 10 and 210 are paired. Entering the process at 800, a user scans the case label at 810 with the handheld printer/scanner device 210. At 820, the scanned data is sent to the barcode host printer 10 where it can be processed by an application program to obtain the Vendor, Item Number, Lot or Serial Number, and Best By date. This data can be used by barcode host printer 10 when printing labels for the transformation step of food prep to identify food items' lot numbers or serial numbers and use by dates.

At 825 the case is opened. The application on host barcode printer 10 will prompt for inner packs at 830. If yes, the process proceeds to 835 to print and apply a received label with the key data elements and a barcode that can be scanned when the item is removed from food storage for food prep. This label has an incrementing count for each inner pack. At 840, the user determines if more inner pack labels are needed and the process continues until the carton is empty. If at 830 there were no inner packs for the carton, then the process continues to 850 where the handheld printer/scanner device 210 prints a received label for the carton containing the key data elements needed for the critical tracking event. Then, both the no branches of 840 and 850 proceed toward putting the item away.

At 845, the need for cold storage is determined by the user or alternately the application program on host barcode printer 10 could contain the proper storage method of the received item. If cold storage is not needed, the process continues to 855 where the inner pack or case is received and then transferred to dry storage at 860. The process then continues to prompt for receiving another case at 885. If yes, then the process returns to 810 and starts over, and if there are no more cases the process exits at 890.

If at 845 it is determined that the user is receiving a cold storage item, the process continues to 865. Then at 870, it is determined if the cold storage item should be stored frozen or under refrigeration. If the cold storage item should be stored frozen, the process continues to 880 and the item is placed in the freezer. If the cold storage item should be stored under refrigeration, the process continues to 875 and the item is placed in the refrigerator. Then, the process continues to 885 to determine if more cases are to be received. If yes, the process continues to 810 and starts over, and if no the process continues to 890 and exits.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A receiving process completed after a host barcode printer is paired with a handheld printer/scanner device, comprising the steps of:
   scanning a case label with the handheld printer/scanner device;
   sending scanned data to the host barcode printer where it is processed by an application program to obtain the Vendor, Item Number, Lot or Serial Number, and Best By date;
   using this data by the host barcode printer when printing labels to identify food items' lot numbers or serial numbers and use by dates;
   opening a case;
   prompting the host barcode printer for inner pack labels;
   if yes, then proceeding to print and apply labels to the food items with key data elements and a barcode that can be scanned when the food items are removed from food storage for food prep;
   determining if more inner pack labels are needed; and
   continuing the process until the carton is empty.

2. The receiving process of claim 1, further comprising: if there are no inner packs for the carton, then printing a received label for the carton containing the key data elements needed for a critical tracking event.

3. The receiving process of claim 1, further comprising: determining need for cold storage to determine the proper storage method of a received item.

4. The receiving process of claim 3, wherein determining is done by a user or by the application program on the host barcode printer.

5. The receiving process of claim 4, wherein if the received item does not belong in cold storage, placing the inner pack or case in dry storage.

6. The receiving process of claim 5, further comprising: prompting a user to receive another case.

7. The receiving process of claim 6, wherein if there is another case, then returning to the beginning of the receiving process and starting over.

8. The receiving process of claim 6, wherein if there is not another case, then exiting the receiving process.

9. The receiving process of claim 4, wherein if receiving a cold storage item, determining if the cold storage item is stored under refrigeration or frozen.

10. The receiving process of claim 9, further comprising determining if more cases are to be received.

11. The receiving process of claim 1, where the host barcode printer has at least one antenna and at least one USB port.

12. An item receiving process, comprising the steps of:
    scanning a barcode encoded with information;
    sending the information to the host barcode printer;
    extracting a lot number and best by date from the information; and
    printing the lot number and best by date on a food freshness label
    prompting the host barcode printer for inner pack labels;
    proceeding to print and apply labels to the food items with key data elements and a barcode that can be scanned when the food items are removed from food storage for food prep;
    determining if more inner pack labels are needed; and
    continuing the process.

13. The item receiving process of claim 12, where the host barcode printer has at least one antenna and at least one USB port.

14. The item receiving process of claim 12, where the food freshness label for a food item is printed when the food item is removed from cold storage or dry storage.

15. The item receiving process of claim 12, further comprising printing and applying a received label to an inner pack contained within a carton.

16. The item receiving process of claim 15, where the received label has a barcode printed thereon.

17. The item receiving process of claim 16, where the received label has an incrementing count for each inner pack.

18. The item receiving process of claim 12, further comprising printing a received label for a carton.

19. The item receiving process of claim 12, further comprising determining a proper storage method for the received item.

* * * * *